United States Patent [19]

Lambourn

[11] Patent Number: 5,226,450
[45] Date of Patent: Jul. 13, 1993

[54] FLUID MIXING AND FLOW CONTROL APPARATUS

[75] Inventor: Douglas G. Lambourn, Brisbane, Australia

[73] Assignee: Taylor HPL Pty Ltd., Queensland, Australia

[21] Appl. No.: 883,291

[22] Filed: May 14, 1992

[51] Int. Cl.⁵ .............................................. F16K 11/24
[52] U.S. Cl. .................................... 137/607; 137/613
[58] Field of Search ............... 137/606, 607, 613, 558

[56] References Cited

U.S. PATENT DOCUMENTS 3,653,548  4/1972  Kotscha et al. ................. 137/607 X
3,800,826  4/1974  McCann ........................... 137/606 X
4,128,190  12/1978  Gruber ............................. 137/607 X
4,250,919  2/1981  Booth et al. ......................... 137/607
4,569,312  2/1986  Riddell et al. .................... 137/558 X Primary Examiner—Stephen M. Hepperle
Attorney, Agent, or Firm—Nixon & Vanderhye

[57] ABSTRACT

A fluid mixing and control apparatus comprises a unitary block of plastic material through which recesses and passageways can be machined or otherwise formed. The block includes two separate fluid pathways, one of which includes a fluid detector. Both pathways include shut-off valves and both pathways include fluid flow controllers to allow the fluids to be mixed together and pass through an outlet in a controlled manner.

9 Claims, 2 Drawing Sheets

FLUID MIXING AND FLOW CONTROL APPARATUS

This Invention relates to a fluid mixing and flow control apparatus suitable for mixing fluids such as liquids for controlling the flow of fluid through an outlet in the apparatus.

The apparatus is particularly suitable, but not limited, to mixing syrup with carbonated water to form a beverage which can subsequently be frozen to form a frozen carbonated beverage which currently enjoys a high popularity.

Carbonated beverages are formed from a mixture of a particular syrup with carbonated water. The syrup typically includes a sugar solution together with various flavours and other desired ingredients. The resultant mixture of syrup and carbonated water (or soda) results in a beverage having a particular brix value.

The retain consistency in the flavour and 'look' of many carbonated beverages, it is important that the brix value is maintained within closely defined parameters. Typically, the brix value should be kept within plus or minus 0.5 brix. A typical brix value for a carbonated beverage is 12–13 brix.

A popular type of beverage is a frozen carbonated beverage. This is obtained by freezing the mixture of syrup and soda in a freezing barrel to form a 'slush' or frozen beverage. It is critical to keep the brix value as accurate as possible as beverages with a higher brix value tend not to freeze properly and become too soft, while beverages with a low brix value become too hard and too icy.

It is known to mix syrup with soda in an assembly containing two flow control meters, one connected to a syrup inlet and one connected to a soda inlet. The flow control meters regulated the amount of syrup and soda which passes through a common outlet to provide the mixed beverage. However, in this known arrangement, the various parts are connected together through hoses and clamps. A disadvantage with such an arrangement is that leakages are prone to occur, especially as the soda and syrup lines are generally pressured to above atmospheric pressure. Leakage of syrup can cause gumming and corrosion of various internal parts and similarly leaking of soda can cause corrosion and malfunction of various parts.

The flow control meters were of a simple design which could not compensate for pressure fluctuations. Therefore, under higher pressure, more syrup or soda would flow through the meter resulting in undesirable brix values.

It is also known to provide a syrup flow detector, usually in the form of a float switch assembly, which operates to shut off the apparatus should a loss of syrup flow occur. In the past however, such a flow detector has again been coupled to a syrup line and to the flow control member through hoses which are again prone to leakage.

A further disadvantage with known systems is that should leakage, malfunction or repair be needed, the various components are required to be unclipped, replaced or repaired and inserted back into the apparatus. This results in a long down time and also in the possibility of fresh leaks occurring due to decoupling and coupling of the various hoses.

The applicant has now developed a simple unitary apparatus which can mix and control the flow of fluids and which overcomes or at least minimises the possibility of leakages occurring by having passageways between the various components formed in a solid block body thereby doing away with the need for hoses and couplings. Furthermore, by having a unitary block body, servicing is considerably minimised and should a fault occur, the entire assembly can be conveniently removed and replaced with a fresh assembly resulting in minimal down time. In a preferred form, the apparatus includes a fluid flow controller which can maintain a steady flow of fluid with variations in the pressure of the fluid.

Therefore, in one form the invention resides in a fluid mixing and flow control apparatus having
a block body,
first and second inlets extending into the block body,
a first recess in the block body being in fluid communication with one of the inlets to at least partially accommodate a fluid detector,
a second recess in the block body being in fluid communication with the first recess to accommodate a first fluid shut-off valve,
a third recess in the block body being in fluid communication with second recess to accommodate a first fluid flow controller,
an outlet in communication with the third recess to allow fluid to exit from the block body,
a fourth recess in the block body which is in fluid communication with the other of the inlets to accommodate a second fluid shut-off valve, and
a fifth recess in the block body which is fluid communication with the fourth recess to accommodate a second fluid flow controller, said fifth recess being in fluid communication with the outlet.

It can be seen by having all the above components able to be accommodated in a single block, the apparatus is compact and the possibility of fluid leakage occurring between the various components is eliminated.

The apparatus is particularly suitable for mixing of carbonated beverages such as syrups and soda, however it may also be suitable for mixing and controlling the flow of other fluid systems.

The block body is suitably formed from plastic or other material which can be moulded or drilled into. Preferably, the body, is formed from a optically clear plastic. One such suitable plastic is sold under the name PERSPEX ®. An optically clear plastic, is desirable as it allows visual inspection of the various components should maintenance and/or repair work need to be carried out. It is envisaged that the block body may also be injection moulded to form the various recesses, or alternatively, the recesses can be drilled or otherwise machined into an initially solid body. The block body is suitably substantially cube shaped.

The first and second inlets may extend into the block body through a rear face thereof. The inlet may be dimensioned to accept one end of an input fitting. If desired, a clip or other securing device may be positioned adjacent each inlet to secure the input fitting to the inlets. The other end of the input fitting may be provided with barbs or other configuration to allow it to be securely attached to a hose.

The first recess may extend into the body through a top wall. The recess is suitably substantially cylindrical in configuration and may extend from the top wall to adjacent the bottom wall. The first recess may be in fluid communication with the respective inlet through a bore which can be drilled into the block body. The first recess may accommodate a fluid detector. The fluid detector suitably comprises a buoyant member such as a float. The float can move between upper and lower positions depending on the volume of fluid in the first recess and suitably activates a switch or like member should the volume of fluid in the recess vary past predetermined limits. The fluid detector may in turn cause shut-off of fluid through the respective inlet should the volume of fluid vary past the predetermined limits.

The first recess may be in fluid communication with the second recess through a bore which can conveniently be drilled through the block body. The bore may extend from adjacent a lower end of the first recess to adjacent a lower end of the second recess. Desirably, a further bore is formed in the block body extending from adjacent an upper portion of the first recess to intermediate the above-referenced bore. This in effect results in a pressure equalising effect to the first recess to ensure that the float smoothly moves between upper and lower positions.

The second recess may in the form of a cylindrical bore extending from the top face of the block body. The bore may accommodate a valve member which can move between open and closed positions. The valve member may comprise a piston of a first solenoid whereby operation of the solenoid results in retraction or extension of the piston which in turn functions to open or shut off the flow of fluid through the second recess.

The third recess may comprise a cylindrical bore extending through a front face of the block body. The cylindrical bore may be in fluid communication with the second recess through a passageway which can be machined or otherwise formed in the block body. The bore suitably accommodates a first fluid flow controller. The first fluid flow controller may be of the type to ensure a constant flow of fluid therethrough irrespective of pressure variations. The outlet may extend from a side face of the block and in fluid communication with the third recess. The outlet may be dimensioned to accept an outlet fitting and a clip or other securement device may be provided adjacent the outlet to prevent inadvertent removal of the outlet fitting.

The fourth recess may again comprise a bore extending through the top face of the block body and can be in fluid communication with the other of the inlets through a passageway which can be machined or otherwise formed in the block body. The fourth recess may be substantially similar to the second recess and may again accommodate a valve which suitably is in the form of a solenoid piston of a second solenoid.

The fifth recess may comprise a bore extending through a front face of the block body and may again accommodate a second fluid flow controller similar or identical to the first fluid flow controller. The fifth recess may be formed in fluid communication with the fourth recess by a passage or bore machined or otherwise formed into the block body. The fifth recess may be coupled to the outlet either directly or via a third recess to result in mixing of the fluids.

Figure 1:
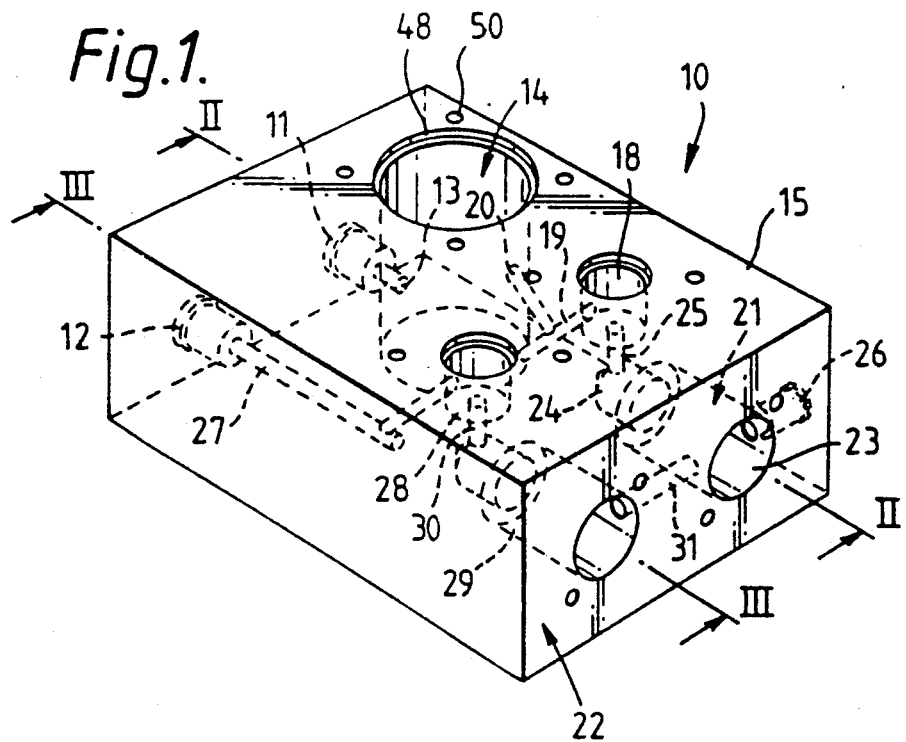
FIG. 1 is a perspective view of a block body according to an embodiment of the invention illustrating the various bores and passages.
Figure 3:
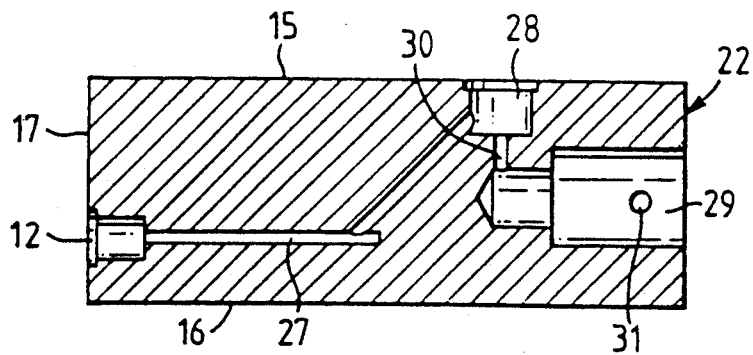
FIG. 3 is an elevation view of FIG. 1 taken along section line 3—3.

DETAILED DESCRIPTION OF THE INVENTION:

Referring to the drawings and especially FIG. 1, there is shown a fluid mixing and flow control apparatus comprising a block body 10 of rectangular configuration which is formed from optically clear plastic such as PERSPEX ®. The block in the embodiment is approximately 13 centimeters in length, 9 centimeters in width and 5 centimeters high. Thus, the entire apparatus is compact in design.

Figure 4:
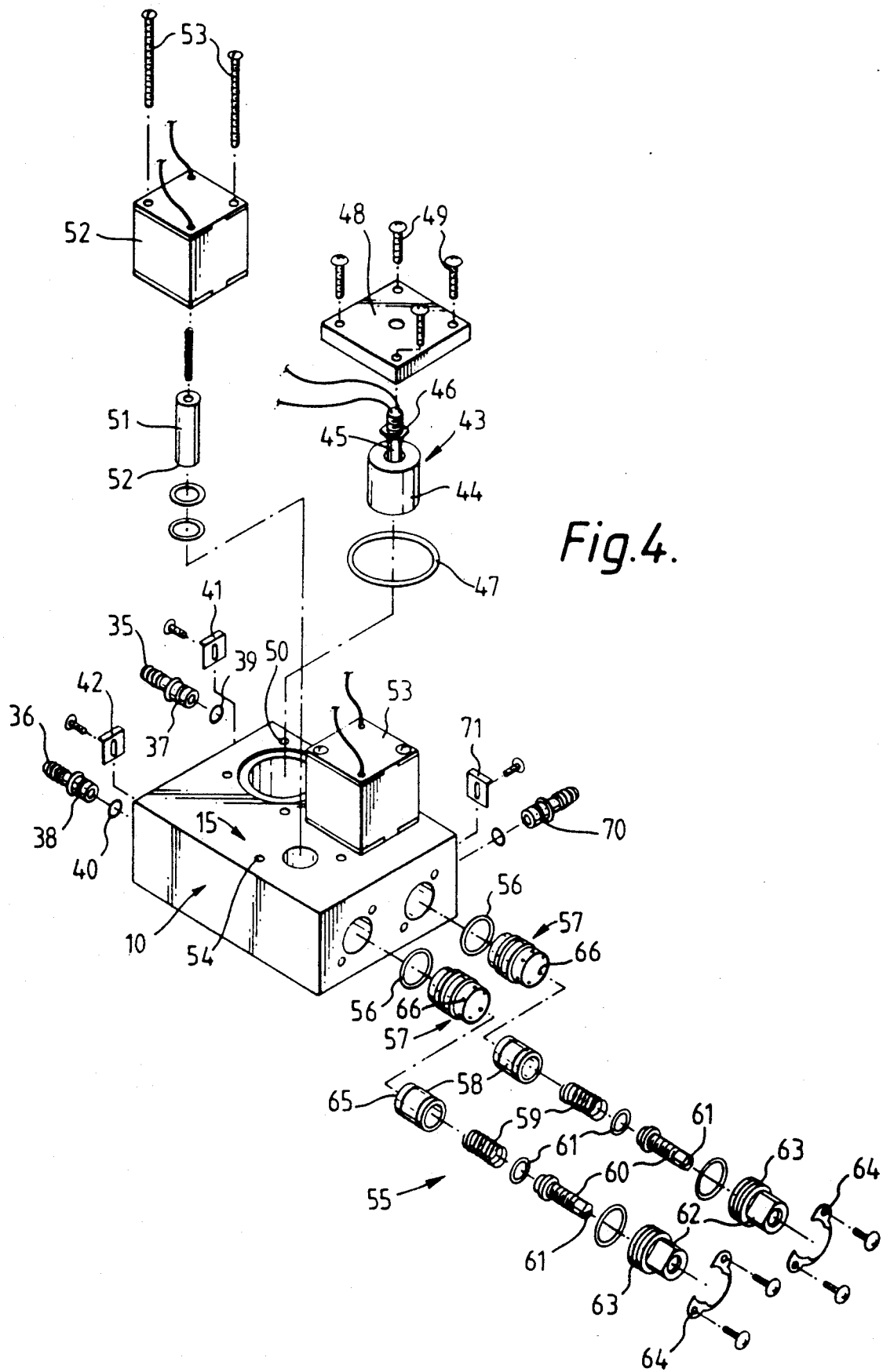
FIG. 4 is an exploded view of the apparatus showing the various fittings.

Block body 10 is provided with a pair of inlets 11, 12 which are drilled into the rear face 17 of body 10. Inlet 11 is a syrup inlet while inlet 12 is an inlet for carbonated water (i.e., soda inlet). Inlets 11 and 12 are cylindrical in configuration and have a diameter to accommodate inlet fittings 35, 36 as illustrated in FIG. 4.

Figure 2:
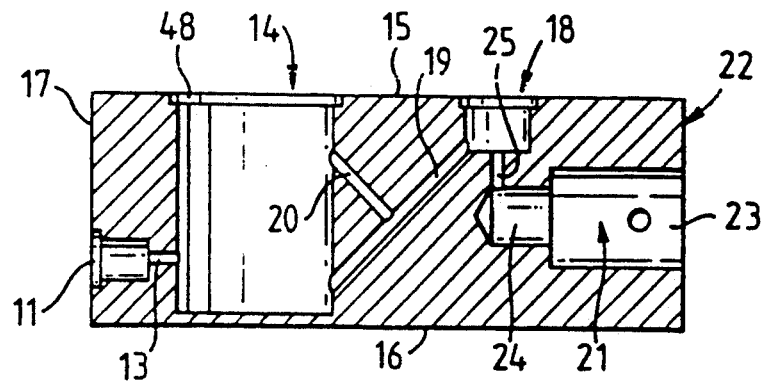
FIG. 2 is an elevation view of FIG. 1 taken along section line 2—2.

A short bore 13 is drilled into block body 10 to connect inlet 11 with first recess 14. First recess 14 extends from a top face 15 of block body 10 to adjacent a bottom face 16 as more clearly illustrated in FIG. 2. First recess 14 is cylindrical in configuration. Recess 14 houses a fluid detector more clearly illustrated in FIG. 4 which shall be discussed in greater detail below.

Block 10 includes a second recess 18 extending through top face 15 and located downstream of recess 14. Second recess 18 is a cylindrical bore dimensioned to accommodate a solenoid piston as illustrated in FIG. 4 and which shall be described in greater detail below. Second recess 18 is connected to first recess 14 by a bore 19 machined through block 10. Bore 19 extends from adjacent a lower portion of recess 18 to adjacent a lower portion of recess 14. A further angled bore 20 is machined into block 10 from adjacent an upper portion of recess 14 to intermediate the ends of bore 19. The function of this arrangement is to provide a pressure equalising effect for the fluid detector to ensure its smooth operation.

A third recess 21 extends into block 10 through a front face 22 thereof. Third recess 21 comprises a cylindrical bore having a first front portion 23 of larger diameter and a second rear portion 24 of smaller diameter. The second rear portion 24 is in fluid communication with second recess 18 by a bore 25. Third recess 21 is in fluid communication with an outlet 26 which extends through a side wall of block body 10. Outlet 26 comprises a short cylindrical bore which can accommodate an outlet fitting 70 as more clearly shown with reference to FIG. 4.

The above arrangement describes the fluid flow pathway for the syrup.

For the soda stream, the soda initially passes into block body 10 through inlet 12. Inlet 12 is configured in a manner identical to inlet 11 to accommodate an inlet fitting 36 as illustrated in FIG. 4. A passageway or bore 27 is machined or otherwise formed in block 10 to connect inlet 12 with fourth recess 28. Fourth recess 28 is formed in top face 15 in a manner identical to that of second recess 18 to again accommodate the piston of a second solenoid as illustrated in FIG. 4.

Fourth recess 28 is in fluid communication with fifth recess 29 through a short bore 30. Fifth recess 29 is formed identical to that of third recess 21 and extends into block 10 through front face 22. Fifth recess 29 is in fluid communication with third recess 21 through a short bore or passageway 31 which results in mixing of the soda and syrup streams before the combined stream exits through outlet 26.

Referring now to FIG. 4 there is shown an exploded view of the various components which are attached to block body 10. Inlets 11 and 12 are provided with input fittings 35, 36. Input fittings are formed with a forward smooth portion 37. 38 having an annual recess to accommodate a sealing ring 39, 40. Portions 37, 38 can be press-fitted into inlets 11, 12, and to prevent the fittings from being removed, securing clips 41, 42 are screwed into block 10 immediately above inlets 11, 12.

First recess 14 accommodates a fluid detector. The fluid detector is in the form of a float switch assembly 43 of a known design having a float member 44 slidably moveable along a shaft 45 with a switch 46 located long an upper portion such that when float 44 contacts switch 46, a circuit is closed which in turn results in the apparatus being switched on or switched off as the case may be. Float 44 is of a cylindrical configuration to fit within first recess 14. An O-ring 47 is provided which fits into a annular recess 48 on an upper portion of first recess 14. The recess 14 is sealed through a float cover 48 in the form of a metal plate which can be secured to block body 10 through fasteners 49 extending through corresponding apertures 50 on block body 10. The pressure equalising effect caused by bores 19 and 20 prevents the float 44 from sticking and facilitates drainage of syrup.

Second recess 18 and fourth recess 28 are provided with shut-off valves in the form of solenoid pistons 51 (the other piston not shown). Solenoid piston 51 fits within a solenoid of known design. The solenoid housing 52, 53 is fastened to top face 15 of block body 10 by fasteners 53 extending through aligned apertures 54. Operation of the respective solenoid causes the respective solenoid piston to retract into the respective housing which allows fluid to flow through the block while extension of the respective solenoid piston functions to shut off the fluid flow by having the axial face 52 of the solenoid piston overlying the respective bore or passage 25, 32.

The third and fifth recesses are each fitted with respective and identical fluid flow controllers shown generally as 55. Typically, the fluid flow controllers comprise an O-ring 56, sleeve flow controllers 57 which are fitted into the respective recess 21, 29. Into the sleeve flow control is fitted a respective piston 58 which is formed from a ceramic material. Piston 58 is biased through the respective sleeve by spring 59. Spring 59 abuts against an adjustment screw 60 through a respective O-ring 61. Adjustment screw 60 has a grooved end 61 to accommodate the blade of a screwdriver or like member and the end 61 extends through a collar 62 having a smooth annular body portion 63 which can be press-fitted into recess 23 or 29 and retained therein by clips 64. By rotation of the respective adjustment screw, the flow rate can be adjusted.

The fluid flow controllers function to provide a constant volume of fluid flow irrespective of pressure variations. This is achieved by the hollow piston members 58 which are each provided with a fluid flow aperture (not shown) 65 on their axial end walls to allow fluid to flow into the piston. Sleeves 57 are also provided with a plurality of fluid flow apertures 66 adjacent the end walls thereof. As pressure is increased in the system, pistons 58 are forced backwards which reduces the number of apertures 66 available for fluid flow. Conversely, upon reduction of pressure in the system, pistons 58 are forced forward by springs 59 to provide a greater number of apertures 66 for fluid flow. This results in an even volume of fluid flowing through the system irrespective of pressure variations.

Soda flowing through inlet 12 and through the system passes through the respective fluid flow controller and then through bore 31 to mix with syrup passing through inlet 11 and through the other fluid flow controller. The mixed syrup/soda stream then exits through outlet 26 which is fitted with an outlet fitting 70 identical to fittings 35, 36 which is again secured to block body 10 clip 71.

It can be seen that the above apparatus is a compact, a unitary device. The device allows separate fluid streams (i.e., syrup and soda streams) to be mixed accurately and the flow of the fluids can also be accurately maintained. By having all the connections between the various components machined through or otherwise formed into a block, there is no possibility of leakage occurring through faulty hoses or clamps. The various components are mounted together and the entire apparatus can be conveniently removed for inspection, maintenance or repair with minimal down time.

It should be appreciated that various other changes and modifications can be made to the embodiment described without departing from the spirit and scope of the invention as claimed.

I claim:

1. A fluid mixing and flow control apparatus having a block body,
first and second inlets extending into the block body,
a first recess in the block body being in fluid communication with one of the inlets and at least partially accommodating a fluid detector,
a second recess in the block body being in fluid communication with the first recess and accommodating a first fluid shut-off valve,
a third recess in the block body being in fluid communication with second recess and accommodating a first fluid flow controller,
an outlet in communication with the third recess to allow fluid to exit form the block body,
a fourth recess in the block body which is in fluid communication with the other of the inlets and accommodating a second fluid shut-off valve, and
a fifth recess in the block body which is in fluid communication with the fourth recess and accommodating a second fluid flow controller, said fifth recess being in fluid communication with the outlet.

2. The apparatus as claimed in claim 1 wherein the fluid detector comprises a float which activates a cut-off switch if the level of fluid in a recess varies past predetermined levels.

3. The apparatus as claimed in claim 2 wherein the first and second fluid shut-off valves comprise pistons of respective first and second solenoids, the pistons being retractable and extendible into the respective recesses to allow fluid to flow through or to shut off the flow of fluid through the respective recesses.

4. The apparatus as claimed in claim 3 wherein fluid passing through one of the fluid flow controllers subsequently passes into the other of the fluid flow controllers to result in mixing of the fluid flows prior to exiting through the outlets.

5. The apparatus as claimed in claim 4 wherein the first recess is in fluid communication with the second recess through a first passageway extending from a lower portion of the first recess and a second passageway extending from an upper portion of the recess thereby providing a pressure equalising effect for the float.

6. The apparatus as claimed in claim 5 wherein the block body has a cube-like configuration having a top face, bottom face, front face, rear face, and a pair of opposed side faces.

7. The apparatus as claimed in claim 6 wherein the inlets extend through a rear face of the block body, the first, second and fourth recesses extend through a top face of the block body and the third and fifth recesses extend through a front face of the body.

8. The apparatus as claimed in claim 7 when the body is formed from a clear plastic material.

9. The apparatus as claimed in claim 8 wherein the inlets are connected to a syrup flow and a soda flow to provide a beverage.

* * * * *